United States Patent
Wengeler et al.

(10) Patent No.: US 8,299,207 B2
(45) Date of Patent: Oct. 30, 2012

(54) PROCESS FOR REMOVING RESIDUAL MONOMERS FROM WATER-ABSORBING POLYMER PARTICLES

(75) Inventors: Robert Wengeler, Karlsruhe (DE); Karin Flore, Floersheim-Dalsheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/070,191

(22) Filed: Mar. 23, 2011

(65) Prior Publication Data

US 2011/0237767 A1 Sep. 29, 2011

Related U.S. Application Data

(60) Provisional application No. 61/316,877, filed on Mar. 24, 2010.

(30) Foreign Application Priority Data

Mar. 24, 2010 (EP) .................................... 10157574

(51) Int. Cl.
 *C08G 75/02* (2006.01)
 *B32B 5/16* (2006.01)
(52) U.S. Cl. ..................... 528/499; 428/402; 526/219.2; 526/235; 526/317.1; 526/318.42
(58) Field of Classification Search .................. 428/402; 526/219.2, 235, 317.1, 318.42
 See application file for complete search history.

(56) References Cited

U.S. PATENT DOCUMENTS

| 4,020,256 A | 4/1977 | Zweigle et al. |
| 4,670,524 A | 6/1987 | Messmer et al. |
| 6,150,477 A | 11/2000 | Engelhardt et al. |
| 8,044,158 B2 * | 10/2011 | Losch et al. ............... 526/317.1 |
| 2002/0193546 A1 | 12/2002 | Freeman et al. |
| 2010/0035059 A1 * | 2/2010 | Losch et al. .................. 428/402 |

FOREIGN PATENT DOCUMENTS

| DE | 3519013 A1 | 11/1986 |
| EP | 0 348 180 A2 | 12/1989 |
| EP | 0 816 383 A1 | 1/1998 |
| WO | WO-96/40427 A1 | 12/1996 |
| WO | WO-2008/095901 A1 | 8/2008 |

OTHER PUBLICATIONS

Buchholz et al., Modern Superabsorbent Polymer Technology, Wiley-VCH, pp. 71-103 (1998).

* cited by examiner

*Primary Examiner* — Terressa Boykin
(74) *Attorney, Agent, or Firm* — Marshall, Gerstein & Borun LLP

(57) ABSTRACT

A process for removing residual monomers from water-absorbing polymer particles, wherein the water-absorbing polymer particles are thermally aftertreated in a mixer with rotating mixing tools at a temperature of at least 60° C. in the presence of water vapor.

11 Claims, No Drawings

PROCESS FOR REMOVING RESIDUAL MONOMERS FROM WATER-ABSORBING POLYMER PARTICLES

CROSS-REFERENCE TO RELATED APPLICATIONS

This application claims the benefit of U.S. provisional patent application No. 61/316,877, filed Mar. 24, 2010, incorporated herein by reference in its entirety.

The present invention relates to a process for removing residual monomers from water-absorbing polymer particles, wherein the water-absorbing polymer particles are thermally aftertreated in a mixer with rotating mixing tools at a temperature of at least 60° C. in the presence of water vapor.

The production of water-absorbing polymer particles is described in the monograph "Modern Superabsorbent Polymer Technology", F. L. Buchholz and A. T. Graham, Wiley-VCH, 1998, pages 71 to 103.

Being products which absorb aqueous solutions, water-absorbing polymers are used to produce diapers, tampons, sanitary napkins and other hygiene articles, but also as water-retaining agents in market gardening. Water-absorbing polymers are also referred to as "superabsorbent polymers" or "superabsorbents".

Spray polymerization allows the process steps of polymerization and drying to be combined. In addition, the particle size can be adjusted within certain limits by virtue of a suitable process regime.

The production of water-absorbing polymer particles by spray polymerization is described, for example, in EP 0 348 180 A1, EP 0 816 383 A1, WO 96/40427 A1, U.S. Pat. No. 4,020,256, US 2002/0193546 and DE 35 19 013 A1.

WO 2008/095901 A1 describes a process for removing residual monomers by thermal aftertreatment with steam in the fluidized state.

It was an object of the present invention to provide an improved process for removing residual monomers from water-absorbing polymer particles.

More particularly, it was an object of the present invention to provide a particularly inexpensive process.

The object was achieved by a process for removing residual monomers from water-absorbing polymer particles, which comprises thermally aftertreating the water-absorbing polymer particles in a mixer with rotating mixing tools in the presence of a gas stream, said water-absorbing polymer particles having a temperature of at least 60° C. and a moisture content of at least 3% by weight during the thermal aftertreatment, and said gas stream comprising at least 0.01 kg of water vapor per kg of dry gas.

The temperature of the water-absorbing polymer particles during the thermal aftertreatment is preferably from 60 to 140° C., more preferably from 70 to 125° C. and very particularly from 80 to 110° C.

The moisture content of the water-absorbing polymer particles during the thermal aftertreatment is preferably from 3 to 50% by weight, more preferably from 6 to 30% by weight and most preferably from 8 to 20% by weight.

The gas stream comprises water vapor, preferably from 0.01 to 1 kg per kg of dry gas, more preferably from 0.05 to 0.5 kg per kg of dry gas and most preferably from 0.1 to 0.25 kg per kg of dry gas.

The mean residence time in the mixer during the thermal aftertreatment is preferably from 10 to 120 minutes, more preferably from 15 to 90 minutes and most preferably from 20 to 60 minutes.

The gas volume used for thermal aftertreatment in a batchwise mixer is preferably from 0.01 to 5 $m^3$ (STP)/h, more preferably from 0.05 to 2 $m^3$ (STP)/h and most preferably from 0.1 to 0.5 $m^3$ (STP)/h, in each case per kg of water-absorbing polymer particles, and, in a continuous mixer, preferably from 0.01 to 5 $m^3$ (STP)/h, more preferably from 0.05 to 2 $m^3$ (STP)/h and most preferably from 0.1 to 0.5 $m^3$ (STP)/h, in each case per kg/h of water-absorbing polymer particle throughput. The gas volume here is the gas volume corrected to standard conditions (0° C.; 1013.25 hPa).

The remaining constituents of the gas are preferably nitrogen, carbon dioxide, argon, xenon, krypton, neon, helium, air or air/nitrogen mixtures, more preferably nitrogen or air/nitrogen mixtures containing less than 10% by volume of oxygen.

The presence of oxygen can lead to discoloration of the water-absorbing polymer particles. Air, in contrast, is particularly inexpensive.

In the process according to the invention, it is possible to use all batchwise and continuous mixers which have rotating mixing tools and are known to those skilled in the art, such as screw mixers, disk mixers, helical ribbon mixers and paddle mixers. Suitable mixers are, for example, Becker Shovel Mixers (Gebr. Lödige Maschinenbau GmbH; Paderborn; Germany), Nara Paddle Mixers (NARA Machinery Europe; Frechen; Germany), Pflugschar® plowshare mixers (Gebr. Lödige Maschinenbau GmbH; Paderborn; Germany), Vrieco-Na a Continuous Mixers (Hosokawa Micron BV; Doetinchem; the Netherlands), Processall Mixmill Mixers (Processall Incorporated; Cincinnati; US) and Ruberg continuous flow mixers (Ruberg GmbH & Co KG; Nieheim; Germany). In the process according to the invention, preference is given to using Becker Shovel Mixers, Pflugschar® plowshare mixers and Ruberg continuous flow mixers for thermal aftertreatment.

Mixers with rotating mixing tools are divided into vertical mixers and horizontal mixers according to the position of the axis of rotation. Advantageously, horizontal mixers are used for the process according to the invention.

Horizontal mixers in the context of this invention are mixers with rotating mixing tools, the position of the axis of rotation of which with respect to the product flow direction deviates from the horizontal by less than 20°, preferably by less than 15°, more preferably by less than 10° and most preferably by less than 5°.

For mixers with horizontally mounted mixing tools, the Froude number is defined as follows:

$$Fr = \frac{\omega^2 r}{g}$$

where
  r: radius of the mixing tool
  ω: angular frequency
  g: acceleration due to gravity The Froude number is preferably from 0.1 to 6, more preferably from 0.15 to 3 and most preferably from 0.2 to 1.

The inner wall of the mixer has, with respect to water, a contact angle of preferably less than 70°, more preferably of less than 60° and most preferably of less than 50°. The contact angle is a measure of the wetting behavior and is measured to DIN 53900.

It is advantageous in the process according to the invention to use mixers whose inner wall which is in contact with the product is made of a stainless steel. Stainless steels typically have a chromium content of 10.5 to 13% by weight. The high chromium content leads to a protective passivation layer of chromium dioxide on the steel surface. Further alloy constituents increase the corrosion resistance and improve the mechanical properties.

Particularly suitable steels are austenitic steels with, for example, at least 0.08% by weight of carbon. The austenitic steels advantageously comprise further alloy constituents, preferably niobium or titanium, in addition to iron, carbon, chromium, nickel and optionally molybdenum.

The preferred stainless steels are steels with materials number 1.43xx or 1.45xx according to DIN EN 10020, where xx may be a natural number from 0 to 99. Particularly preferred materials are the steels with materials numbers 1.4301, 1.4541 and 1.4571, especially steel with materials number 1.4301.

Advantageously, the inner wall of the mixer which is in contact with the product is polished. Polished stainless steel surfaces have a lower roughness and a lower contact angle with respect to water than matt or roughened steel surfaces.

The present invention is based on the finding that residual monomers can be removed particularly effectively from water-absorbing polymer particles by contact with a flowing gas in a mixer with rotating mixing tools. Use of mixers with rotating mixing tools allows the gas rate and especially the water vapor content to be lowered significantly with the same efficacy of the thermal aftertreatment.

It is important here that the polymer particles are not too dry. In the case of excessively dry particles, the residual monomer level is reduced only insignificantly. An excessively high moisture content increases the tendency of the polymer particles to cake. In order that the water-absorbing polymer particles do not dry too rapidly during the thermal aftertreatment, the incoming gas must already comprise water vapor.

The production of the water-absorbing polymer particles is described hereinafter:

The water-absorbing polymer particles are produced, for example, by polymerizing a monomer solution comprising:
a) at least one ethylenically unsaturated monomer which bears acid groups and may be at least partly neutralized,
b) at least one crosslinker,
c) at least one initiator,
d) optionally one or more ethylenically unsaturated monomers copolymerizable with the monomers mentioned under a),
e) optionally one or more water-soluble polymers and
and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water, most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a maximum purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The acid groups of the monomers a) have typically been partly neutralized, preferably to an extent of at least 25 mol %, more preferably to an extent of 50 to 80 mol %, especially preferably 60 to 75 mol % and most preferably 65 to 72 mol %, for which the customary neutralizing agents can be used, preferably alkali metal hydroxides, alkali metal oxides, alkali metal carbonates or alkali metal hydrogencarbonates, and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof. Typically, neutralization is achieved by mixing in the neutralizing agent in the form of an aqueous solution, in the form of a melt, or else preferably in solid form. For example, sodium hydroxide with a moisture content significantly below 50% by weight may be in the form of a waxy material with a melting point above 23° C. In this case, metered addition as piece material or a melt at elevated temperature is possible.

Optionally, one or more chelating agents may be added to the monomer solution or starting materials thereof to mask metal ions, for example iron, for the purpose of stabilization. Suitable chelating agents are, for example, alkali metal citrates, citric acid, alkali metal tartrates, pentasodium triphosphate, ethylenediamine tetraacetate, nitrilotriacetic acid, and also all chelating agents known by the Trilon® name, for example Trilon® C (pentasodium diethylenetriaminepentaacetate), Trilon® D (trisodium (hydroxyethyl)ethylenediaminetriacetate), and Trilon® M (methylglycinediacetic acid).

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, preferably at least 10 ppm by weight, more preferably at least 30 ppm by weight, especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b)

are, for example, ethylene glycol dimethacrylate, diethylene glycol diacrylate, polyethylene glycol diacrylate, ally methacrylate, trimethylolpropane triacrylate, triallylamine, tetraallylammonium chloride, tetraallyloxyethane, as described in EP 0 530 438 A1, di- and triacrylates, as described in EP 0 547 847 A1. EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.3 to 0.6% by weight, based in each case on monomer a). With rising crosslinker content, the centrifuge retention capacity (CRC) falls and the absorption under a pressure of 21.0 $g/cm^2$ (AUL0.3 psi) passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. The reducing component used is, however, preferably a mixture of the sodium salt of 2-hydroxy-2-sulfinatoacetic acid, the disodium salt of 2-hydroxy-2-sulfonatoacetic acid and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate and diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The moisture content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising moisture content, the energy requirement in the subsequent drying rises, and, with falling moisture content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

Suitable reactors are, for example, kneading reactors or belt reactors (gel polymerization). In the kneader, the polymer gel formed in the polymerization of an aqueous monomer solution is comminuted continuously by, for example, contrarotatory stirrer shafts, as described in WO 2001/038402 A1. Polymerization on a belt is described, for example, in DE 38 25 366 A1 and U.S. Pat. No. 6,241,928. Polymerization in a belt reactor forms a polymer gel which has to be comminuted in a further process step, for example in an extruder or kneader.

When kneading reactors or belt reactors are used, it is possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The resulting polymer gel is preferably dried with a belt drier until the residual moisture content is preferably 0.5 to 15% by weight, more preferably 1 to 10% by weight and most preferably 2 to 8% by weight, the residual moisture content being determined by the EDANA recommended test method No. WSP 230.2-05 "Moisture Content". In the case of too high a residual moisture content, the dried polymer gel has too low a glass transition temperature $T_g$ and can be processed further only with difficulty. In the case of too low a residual moisture content, the dried polymer gel is too brittle and, in the subsequent comminution steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Thereafter, the dried polymer gel is ground and classified, and the apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 μm is preferably at least 90% by weight, more preferably at least 95% by weight and most preferably at least 98% by weight.

Polymer particles with too small a particle size lower the permeability (SFC). The proportion of excessively small polymer particles ("fines") should therefore be small.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting water-absorbing polymer particles. However, this can be compensated, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 μm is preferably at least 90% by weight, more preferably at least 95% by weight and most preferably at least 98% by weight.

Polymer particles with too great a particle size lower the swell rate. The proportion of excessively large polymer particles should therefore likewise be small.

Excessively large polymer particles are therefore typically removed and recycled into the grinding of the dried polymer gel.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

For this purpose, the monomer solution is metered into the reaction chamber by means of at least one hole to form droplets. The holes may, for example, be in a dropletizer plate.

A dropletizer plate is a plate with at least one hole, the liquid passing through the hole from the top. The dropletizer plate or the liquid can be oscillated, which generates a chain of ideally monodisperse droplets at each hole on the underside of the dropletizer plate. In a preferred embodiment, the dropletizer plate is not agitated.

The number and size of the holes are selected according to the desired capacity and droplet size. The droplet diameter is typically 1.9 times the diameter of the hole. What is important here is that the liquid to be dropletized does not pass through the hole too rapidly and the pressure drop across the hole is not too great. Otherwise, the liquid is not dropletized, but rather the liquid jet is broken up (sprayed) owing to the high kinetic energy. The Reynolds number based on the throughput per hole and the hole diameter is preferably less than 2000, more preferably less than 1600, especially preferably less than 1400 and most preferably less than 1200.

The underside of the dropletizer plate has a contact angle with respect to water of preferably at least 60°, more preferably at least 75° and most preferably at least 90°.

The contact angle is a measure of the wetting behavior of water with respect to a surface, and can be determined by customary methods, for example to ASTM D 5725. A low contact angle means good wetting, and a high contact angle poor wetting.

However, it is also possible that the dropletizer plate consists of a material with a relatively low contact angle with respect to water, for example a steel with materials number 1.4571, and is coated with a material having a greater contact angle with respect to water.

Suitable coatings are, for example, fluorinated polymers, such as perfluoroalkoxyethylene, polytetrafluoroethylene, ethylene-chlorotrifluoroethylene copolymers, ethylene-tetrafluoroethylene copolymers and fluorinated polyethylene.

The coatings may also be applied in the form of a dispersion, in which case the dispersant evaporates in the course of the subsequent heating. Such a process is described, for example, in U.S. Pat. No. 3,243,321.

Further coating processes can be found under the heading "Thin Films" in the electronic version of "Ullmann's Encyclopedia of Industrial Chemistry".

However, the coating may also be a nickel layer produced by chemical nickel plating.

Owing to the poor wettability of the dropletizer plate, monodisperse droplets with narrow droplet size distribution are obtained.

The dropletizer plate has preferably at least 5, more preferably at least 25 and most preferably at least 50 holes, and preferably up to 750, more preferably up to 500 and most preferably up to 250 holes. The diameter of the holes is selected according to the desired droplet size.

The diameter of the holes is preferably from 50 to 500 μm, more preferably from 100 to 300 μm and most preferably from 150 to 250 μm.

The temperature of the monomer solution on passage through the holes is preferably from 5 to 80° C., more preferably from 10 to 70° C. and most preferably from 30 to 60° C.

The distance between the holes is preferably 10 to 50 mm, more preferably 12 to 40 mm and most preferably 15 to 30 mm. Excessively small distances lead to formation of agglomerates.

A carrier gas flows through the polymerization reactor. This carrier gas can be conducted through the reaction chamber in cocurrent or in countercurrent to the free-falling droplets of the monomer solution, preferably in cocurrent, i.e. from the bottom upward. After one pass, the carrier gas is preferably recycled at least partly into the reaction chamber as cycle gas, preferably to an extent of at least 50% and more preferably to an extent of at least 75%. Typically, a portion of the carrier gas is discharged after each pass, preferably up to 10%, more preferably up to 3% and most preferably up to 1%.

The oxygen content of the carrier gas is preferably from 0.5 to 15% by volume, more preferably from 1 to 10% by volume and most preferably from 2 to 7% by weight.

As well as oxygen, the carrier gas preferably comprises nitrogen. The nitrogen content of the carrier gas is preferably at least 80% by volume, more preferably at least 90% by volume and most preferably at least 95% by volume. Further suitable carrier gases are carbon dioxide, argon, xenon, krypton, neon and helium. It is also possible to use gas mixtures. The carrier gas may also be laden with water vapor and/or acrylic acid vapors.

The gas velocity is preferably set such that the flow in the polymerization reactor is directed, for example no convection currents opposed to the general flow direction are present, and is typically 0.1 to 2.5 m/s, preferably 0.3 to 1.5 m/s, more preferably from 0.5 to 1.2 m/s, especially preferably 0.6 to 1.0 m/s and most preferably 0.7 to 0.9 m/s.

The carrier gas flowing through the reactor is appropriately preheated to the reaction temperature upstream of the reactor.

Advantageously, the gas inlet temperature is regulated such that the gas outlet temperature, i.e. the temperature with which the carrier gas leaves the reaction chamber, is typically from 90 to 150° C., preferably from 100 to 140° C., more preferably from 105 to 135° C., especially preferably from 110 to 130° C. and most preferably from 115 to 125° C.

The reaction can be performed under elevated pressure or under reduced pressure; a reduced pressure of down to 100 mbar relative to ambient pressure is preferred.

The reaction offgas, i.e. the gas leaving the reaction chamber, can, for example, be cooled in a heat exchanger. This condenses water and unconverted monomer a). Thereafter, the reaction offgas can at least partly be reheated and recycled into the reactor as cycle gas. A portion of the reaction offgas can be discharged and replaced by fresh carrier gas, in which case water and unconverted monomers a) present in the reaction offgas can be removed and recycled.

Particular preference is given to an integrated system, which means that some of the waste heat in the cooling of the offgas is used to heat the cycle gas.

The reactors may be trace-heated. The trace heating is adjusted such that the wall temperature is at least 5° C. above the internal reactor temperature, and condensation at the reactor walls is reliably prevented.

The reaction product is subsequently thermally aftertreated and optionally dried down to the desired moisture content.

To further improve the properties, the water-absorbing polymer particles may be surface postcrosslinked. Suitable surface postcrosslinkers are compounds which comprise groups which can form covalent bonds with at least two carboxylate groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1,2-oxazolidinone and derivatives thereof, such as 2-hydroxyethyl-2-oxazolidinone, in DE 198 07 502 A1, bis- and poly-2-oxazolidinones in DE 198 07 992 C1,2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyl-2-oxazolidinone, 2-oxazolidinone and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate, citrate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spraying, the polymer particles coated with surface postcrosslinker are dried thermally, and the surface postcrosslinking reaction can take place either before or during the drying.

The spraying of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lödige Maschinenbau GmbH; Paderborn; Germany), Vrieco-Nauta continuous mixers (Hosokawa Micron BV; Doetinchem; the Netherlands), Processall Mixmill mixers (Processall Incorporated; (Cincinnati; US) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/ water, 1,3-propanediol/water and propylene glycol/water, where the mixing ratio in terms of mass is preferably from 20:80 to 40:60.

The thermal drying is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The drying can be effected in the mixer itself, by heating the jacket or blowing in warm air. Equally suitable is a downstream dryer, for example a shelf dryer, a rotary tube oven or a heatable screw. It is particularly advantageous to mix and dry in a fluidized bed dryer.

Preferred drying temperatures are in the range of 100 to 250° C., preferably 120 to 220° C., more preferably 130 to 210° C. and most preferably 150 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles can be classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the water-absorbing polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the swell rate and the permeability (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The process according to the invention enables the production of water-absorbing polymer particles with a very low content of residual monomers.

The water-absorbing polymer particles obtainable by the process according to the invention have a centrifuge retention capacity (CRC) of typically at least 15 g/g, preferably at least 20 g/g, more preferably at least 25 g/g, especially preferably at least 30 g/g and most preferably at least 35 g/g. The centrifuge retention capacity (CRC) of the water-absorbing polymer particles is typically less than 100 g/g. The centrifuge retention capacity of the water-absorbing polymer particles is determined by EDANA recommended test method No. 241.2-02 "Centrifuge Retention Capacity".

The water-absorbing polymer particles obtainable by the process according to the invention have a residual monomer content of typically less than 0.1% by weight, preferably less than 0.07% by weight, more preferably less than 0.05% by weight and most preferably of less than 0.04% by weight. The residual monomer content is determined by EDANA recommended test method No. 210.2-02 "Residual monomers".

The mean diameter of the water-absorbing polymer particles obtainable by the process according to the invention is preferably at least 200 µm, more preferably from 250 to 600 µm and very particularly from 300 to 500 µm, the particle diameter being determinable by light scattering and signifying the volume-average mean diameter. 90% of the polymer particles have a diameter of preferably 100 to 800 µm, more preferably of 150 to 700 µm, most preferably of 200 to 600 µm.

The water-absorbing polymer particles are tested by means of the test methods described below.

Methods

The measurements should, unless stated otherwise, be carried out at an ambient temperature of 23±2° C. and a relative air humidity of 50±10%. The water-absorbing polymers are mixed thoroughly before the measurement.

Residual Monomers

The residual monomer content of the water-absorbing polymer particles is determined by EDANA recommended test method No. 210.2-02 "Residual monomers".

Moisture Content

The moisture content of the water-absorbing polymer particles is determined by EDANA recommended test method No. 230.2-02 "Moisture content".

Centrifuge Retention Capacity (CRC)

The centrifuge retention capacity (CRC) of the water-absorbing polymer particles is determined by EDANA recommended test method No. WSP 241.2-05 "Centrifuge Retention Capacity".

Absorption Under Pressure (AUL0.7 psi)

The absorption under pressure (AUL0.7 psi) of the water-absorbing polymer particles is determined analogously to EDANA recommended test method No. WSP 242.2-05 "Absorption under Pressure", except with a pressure of 49.2 g/cm$^2$ (AUL0.7 psi) instead of a pressure of 21.0 g/cm$^2$ (AUL0.3 psi).

Thr EDANA test methods are obtainable for example, from EDANA, Avenue Eugene Plasky 157, B-1030 Brussels, Belgium.

EXAMPLES

Production of the Water-Absorbing Polymer Particles

Example 1

25.1 kg of sodium acrylate (37.5% by weight solution in water) and 2.9 kg of acrylic acid were mixed with 19 g of 15-tuply ethoxylated trimethylolpropane triacrylate. The initiator used was a 15% by weight aqueous solution of 2,2'-azobis[2-(2-imidazolin-2-yl)propane]dihydrochloride and a 15% by weight aqueous solution of sodium peroxodisulfate. The initiators were metered into the monomer solution by means of a static mixer upstream of a dropletizer. The dropletizer plate had 20×200 µm holes. The resulting mixture was dropletized into a heated dropletization tower filled with a nitrogen atmosphere (height 12 m, width 2 m, gas velocity 0.27 m/s in cocurrent). The metering rate of the monomer solution was 28 kg/h. The metering rate of the initiator solutions was in each case 0.23 kg/h. The heating output of the gas preheater was regulated such that the gas outlet temperature in the dropletization tower was constant at 124° C.

The water-absorbing polymer particles were subsequently analyzed. The residual monomer content was 4500 ppm, the moisture content 5.7% by weight, the centrifuge retention capacity (CRC) 33.7 g/g and the absorption under pressure (AUL0.7 psi) 22.7 g/g.

Example 2

35.9 kg of sodium acrylate (37.5% by weight solution in water) and 4.1 kg of acrylic acid were mixed with 30 g of 15-tuply ethoxylated trimethylolpropane triacrylate. The initiator used was a 15% by weight aqueous solution of 2,2'-azobis[2-(2-imidazolin-2-yl)propane]dihydrochloride and a 15% by weight aqueous solution of sodium peroxodisulfate. The initiators were metered into the monomer solution by means of a static mixer upstream of a dropletizer. The dropletizer plate had 20×180 µm holes. The resulting mixture was dropletized into a heated dropletization tower filled with a nitrogen atmosphere (height 12 m, width 2 m, gas velocity 0.51 m/s in cocurrent). The metering rate of the monomer solution was 40 kg/h. The metering rate of the initiator solutions was in each case 0.33 kg/h. The heating output of the gas preheater was regulated such that the gas outlet temperature in the dropletization tower was constant at 115° C.

The water-absorbing polymer particles were subsequently analyzed. The residual monomer content was 3900 ppm, the moisture content 11.1% by weight, the centrifuge retention capacity (CRC) 28.2 g/g and the absorption under pressure (AUL0.7 psi) 21.1 g/g.

Thermal Aftertreatment

Example 3

50 kg of water-absorbing polymer particles from example 1 were thermally aftertreated in a Becker FM 130 Shovel Mixer (Gebr. Lödige Maschinenbau GmbH; Paderborn; Germany).

To this end, the water-absorbing polymer particles were contacted from below by a nitrogen/water vapor mixture at a Froude number of 1.5 for 30 minutes. The mean product temperature was 81° C. The gas volume used for thermal aftertreatment was 0.22 m$^3$ (STP)/h per kg of water-absorbing polymer particles. The gas temperature was 90° C. The gas stream comprised 0.209 kg of water vapor per kg of dry gas.

The thermally aftertreated polymer particles were subsequently analyzed. The residual monomer content was 300 ppm, the moisture content 9.0% by weight, the centrifuge retention capacity (CRC) 31.6 g/g and the absorption under pressure (AUL0.7 psi) 20.6 g/g.

Example 4

50 kg of water-absorbing polymer particles from example 1 were thermally aftertreated in a Becker FM 130 Shovel Mixer (Gebr. Lödige Maschinenbau GmbH; Paderborn; Germany).

To this end, the water-absorbing polymer particles were contacted from below by a nitrogen/water vapor mixture at a Froude number of 1.5 for 30 minutes. The mean product temperature was 85° C. The gas volume used for thermal aftertreatment was 0.12 m$^3$ (STP)/h per kg of water-absorbing polymer particles. The gas temperature was 90° C. The gas stream comprised 0.209 kg of water vapor per kg of dry gas.

The thermally aftertreated polymer particles were subsequently analyzed. The residual monomer content was 400 ppm, the moisture content 13.1% by weight, the centrifuge retention capacity (CRC) 29.7 g/g and the absorption under pressure (AUL0.7 psi) 17.9 g/g.

Example 5

50 kg of water-absorbing polymer particles from example 2 were thermally aftertreated in a Becker FM 130 Shovel Mixer (Gebr. Lödige Maschinenbau GmbH; Paderborn; Germany).

To this end, the water-absorbing polymer particles were contacted from below by a nitrogen/water vapor mixture at a Froude number of 0.4 for 45 minutes. The mean product temperature was 88° C. The gas volume used for thermal aftertreatment was 0.47 M$^3$ (STP)/h per kg of water-absorbing polymer particles. The gas temperature was 90° C. The gas stream comprised 0.209 kg of water vapor per kg of dry gas.

The thermally aftertreated polymer particles were subsequently analyzed. The residual monomer content was 230 ppm and the moisture content 10% by weight.

Example 6

50 kg of water-absorbing polymer particles from example 2 were thermally aftertreated in a Becker FM 130 Shovel Mixer (Gebr. Lödige Maschinenbau GmbH; Paderborn; Germany).

To this end, the water-absorbing polymer particles were contacted from below by a nitrogen/water vapor mixture at a Froude number of 0.4 for 45 minutes. The mean product temperature was 88° C. The gas volume used for thermal aftertreatment was 0.22 m$^3$ (STP)/h per kg of water-absorbing polymer particles. The gas temperature was 90° C. The gas stream comprised 0.120 kg of water vapor per kg of dry gas.

The thermally aftertreated polymer particles were subsequently analyzed. The residual monomer content was 330 ppm and the moisture content 10% by weight.

The invention claimed is:

1. A process for removing residual monomers from water-absorbing polymer particles, which comprises thermally aftertreating the water-absorbing polymer particles in a mixer with rotating mixing tools in the presence of a gas stream, said water-absorbing polymer particles having a temperature of at least 60° C. and a moisture content of at least 3% by weight during the thermal aftertreatment, and said gas stream comprising at least 0.01 kg of water vapor per kg of dry gas.

2. The process according to claim 1, wherein the water-absorbing polymer particles have a temperature of 80 to 110° C. during the thermal aftertreatment.

3. The process according to claim 1, wherein the gas stream comprises from 0.1 to 0.25 kg of water vapor per kg of dry gas.

4. The process according to claim 1, wherein a mean residence time in the mixer is from 10 to 120 minutes.

5. The process according to claim 1, wherein a gas volume used for the thermal aftertreatment in a batchwise mixer is from 0.01 to 5 m$^3$ (STP)/h per kg of water-absorbing polymer particles, or, in a continuous mixer, from 0.01 to 5 m$^3$ (STP)/h per kg/h of water-absorbing polymer particle throughput.

6. The process according to claim 1, wherein the thermal aftertreatment is performed in a horizontal mixer.

7. The process according to claim 1, wherein the water-absorbing polymer particles are obtained by polymerizing a monomer solution comprising:
   a) at least one ethylenically unsaturated monomer which bears an acid group and may be at least partly neutralized,
   b) at least one crosslinker,
   c) at least one initiator, d) optionally one or more ethylenically unsaturated monomers copolymerizable with the monomer mentioned under a),
e) optionally one or more water-soluble polymers and
f) water.

8. The process according to claim 7, wherein the monomer a) has been neutralized to an extent of at least 25 mol %.

9. The process according to claim 7, wherein the monomer a) is acrylic acid neutralized to an extent of at least 50 mol %.

10. The process according to claim 7, wherein the monomer solution comprises at least 0.1% by weight of crosslinker b), based on unneutralized monomer a).

11. The process according to claim 1 wherein the water-absorbing polymer particles are prepared by dropletizing an aqueous monomer solution and polymerizing the resulting droplets in a heated carrier gas stream.

* * * * *